United States Patent
Morper et al.

(10) Patent No.: US 9,654,371 B2
(45) Date of Patent: May 16, 2017

(54) DETERMINATION OF SYSTEM PERFORMANCE PARAMETERS IN HETEROGENEOUS NETWORK ENVIRONMENTS

(75) Inventors: Hans-Jochen Morper, Erdweg (DE); Christian Markwart, München (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 778 days.

(21) Appl. No.: 13/502,240

(22) PCT Filed: Oct. 22, 2009

(86) PCT No.: PCT/EP2009/063886
§ 371 (c)(1),
(2), (4) Date: Jul. 6, 2012

(87) PCT Pub. No.: WO2011/047721
PCT Pub. Date: Apr. 28, 2011

(65) Prior Publication Data
US 2012/0269082 A1     Oct. 25, 2012

(51) Int. Cl.
*H04L 12/26* (2006.01)
*H04W 84/04* (2009.01)

(52) U.S. Cl.
CPC .......... *H04L 43/10* (2013.01); *H04L 43/0852* (2013.01); *H04W 84/045* (2013.01)

(58) Field of Classification Search
CPC ..... H04L 43/0852; H04L 43/10; H04L 12/26; H04L 41/0896; H04L 43/0817;
(Continued)

(56) References Cited

U.S. PATENT DOCUMENTS

2003/0171112 A1*  9/2003  Lupper et al. ............. 455/414.1
2008/0298313 A1* 12/2008  Salminen ................ H04L 63/08
                                              370/329
(Continued)

FOREIGN PATENT DOCUMENTS

CN      101189898 A      5/2008
WO     2009049678 A1     4/2009

OTHER PUBLICATIONS

Quacchia et al, "TR-135. Data Model for a TR-069 Enabled STB"; Internet Citation, Dec. 31, 2007, pp. 1-114, XP002512769, Retrieved from the internet: http://www.broadband-forum.org/technical/download/TR-135.pdf, retrieved on Jan. 30, 2009.
(Continued)

*Primary Examiner* — Chirag Shah
*Assistant Examiner* — Srinivasa Reddivalam
(74) *Attorney, Agent, or Firm* — Squire Patton Boggs (US) LLP

(57) ABSTRACT

A method of determining system performance parameters, such as delay, present in a network where the network is one of a plurality of heterogeneous networks in a communication system. The communication comprises a first network and a first node, both controlled by a first network operator, and a second network controlled by a second network operator. The first node is located in the second network. The method comprises the steps of: the first node communicating with at least one other node; the first node obtaining system-related information as a result of this communication; the system-related information being used to derive the system performance parameters of the second network.

20 Claims, 4 Drawing Sheets

(58) Field of Classification Search
CPC ... H04L 47/2433; H04L 47/283; H04L 47/30; H04L 47/32; H04L 47/805; H04L 47/828; H04L 63/10; H04W 84/045; H04W 28/0268; H04W 28/20; H04W 72/1226; H04M 15/49

See application file for complete search history.

(56) References Cited

U.S. PATENT DOCUMENTS

| | | | | |
|---|---|---|---|---|
| 2010/0165862 | A1* | 7/2010 | Nylander et al. | 370/252 |
| 2010/0214955 | A1* | 8/2010 | Rune et al. | 370/254 |
| 2011/0149838 | A1* | 6/2011 | Gallagher | H04W 76/041 370/328 |
| 2011/0216749 | A1* | 9/2011 | Chow | H04L 12/2801 370/338 |

OTHER PUBLICATIONS

Jones et al, "TR-143. Enabling Network Throughput Performance Tests and Statistical Monitoring;" May 1, 2008, pp. 1-47, XP002602044. Retrieved from the Internet: http://www.broadband-forum.org/technical/download/TR-143.pdf, retrieved on Sep. 22, 2010.

Yoshizawa et al, "TR-196. Femto Access Point Service Data Model;" Apr. 1, 2009, XP002602045, pp. 1-131, Retrieved from the interent: http://www.broadband-forum.org/technical/download/TR-196.pdf, retrieved on Sep. 22, 2010.

Wey J. S. et al., "Standardization Activities for IPTV Set-Top Box Remote Management," IEEE Internet Computing, IEEE Service Center, vol. 13, No. 3, May 1, 2009, pp. 32-39, XP011256915.

3GPP TS 32.581 V9.1.0 (Sep. 2009), 3rd Generation Partnership Project; Technical Specification Group Services and System Aspects; Telecommunication Management; Home Node B (HNB); Operations, Administration, Maintenance and Provisioning (OAM &P); Concepts and Requirements for Type 1 interface HNB to HNB Management System (HMS) (Release 9), Sep. 1, 2009, pp. 1-11, XP050375399.

International Search Report corresponding to International Application No. PCT/EP2009/063886, dated Oct. 6, 2010.

First Office Action dated Jan. 24, 2014, corresponding to Chinese Patent Application No. 200980162043.7.

\* cited by examiner

DETERMINATION OF SYSTEM PERFORMANCE PARAMETERS IN HETEROGENEOUS NETWORK ENVIRONMENTS

This invention relates to determination of system performance parameters in network environments. It is particularly, but not exclusively, related to delay determination in heterogeneous network environments.

Figure 1:
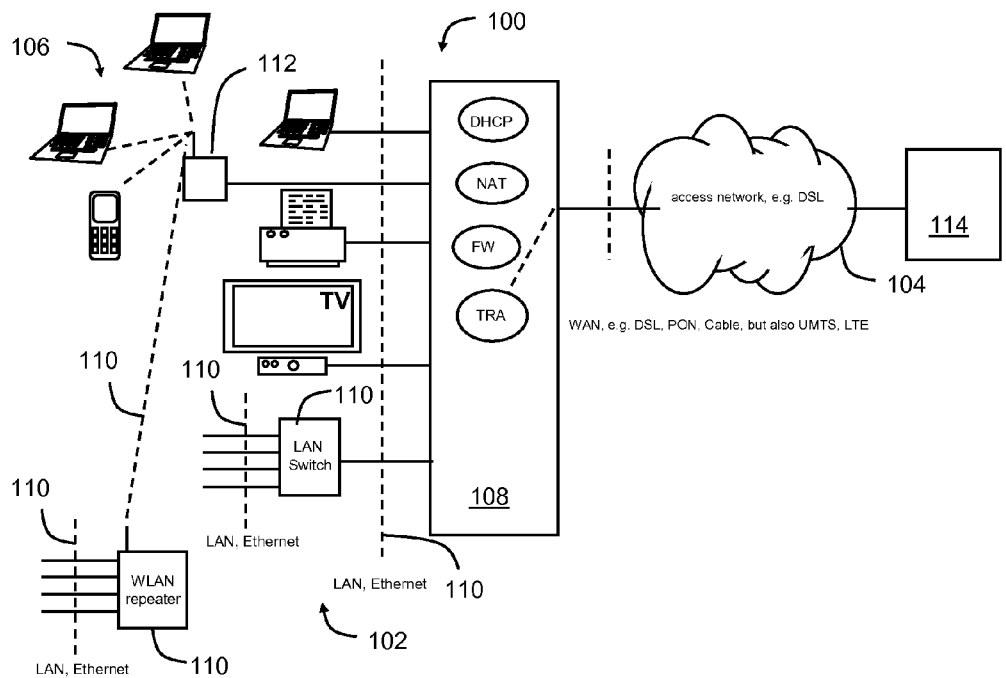

A heterogeneous network environment 100 is shown in FIG. 1. The environment comprises a user network 102 and an access network 104. The user network 102 comprises a variety of devices 106 such as personal computers in the form of desktops, laptops, and notebooks, mobile terminal devices, printers (and printer servers), and a television connected to an access router 108 by an local area network (LAN) 110 (represented here as various interfaces and LAN and wireless LAN (WLAN) elements). The most common general LAN transport interface is Ethernet and thus the devices and network equipment connected to the user network 102 include a hub, a switch, a bridge or a host, all using Ethernet as a transport layer. Some of the devices shown in FIG. 1 are connected directly to the access router 108 and some are connected through further Ethernet based infrastructure devices, such as an Ethernet switch (not shown) or a WLAN access point 112. This connects the mobile terminal devices to the access router 108 by a wireless LAN connection.

The majority of applications on different devices and network equipment run on top of the Internet Protocol (IP). Therefore most of the devices and equipment will run IP sockets in their base software on top of Ethernet (except in pure Ethernet infrastructure devices such as Ethernet switches). Most commonly, a network layer address (IP address) is assigned to those devices dynamically to allow applications to communicate within the user network or to applications outside the user network for example in an external network.

To allow dynamic assignment of IP addresses the devices and equipment typically comprise a dynamic host configuration protocol (DHCP) client functionality which communicates with a DHCP server typically integrated into the access router. This DHCP server keeps a list of all devices and equipment that are connected in the user network 102 and assigns IP addresses upon request from the devices and equipment.

The major task of the access router 108 is to map/mediate between the user network 102 which is a LAN and an external wide area network (WAN). While in many cases the user network 102 is based on Ethernet technology, the external network may be based on other kinds of technologies. The most common alternative technologies are digital subscriber line (DSL) networks, cable (TV) networks, passive optical network (PON) networks, and satellite networks. Accordingly, the user network 102 may need to interwork with different network entities depending on the set-up of external networks. For example, in FIG. 1, the user network 102 interworks with a broadband remote access server (BRAS) 114 in the access network 104.

When data is being transmitted from a device in the user network 102 to the access network 104, the access router 108 transfers the payload (IP packets) from the user network 102 to the access network 104. The user network 102 does not have any information about transport specifics of the access network 104. The access router 108 acts as an authentication client towards the access network 104 and it is authenticated via the BRAS 114 and an AAA server (not shown).

These days, access routers are small, easy-to-use, and have a commodity-like nature. Users have the choice between a variety of access routers with integrated functions The user network 102, also contains various other commodity-like equipment types and functionalities such as DHCP servers, firewalls, a WLAN access point (integrated into the access router 108), and print servers.

In order to provide the interworking/mediation for payload (IP packet) transfer, a network access translation (NAT) function typically performs IP/IP interworking in such a way that one public IP address interworks with numerous internal IP addresses (which had been assigned, for example by an internal DHCP server function). In order to make this possible, outgoing IP packets are supplied with an internally unambiguous port number, and incoming IP packets are mapped to the appropriate internal IP address which can be identified by this port number.

Another function is the use of a firewall (FW). The main task of a firewall is to prevent an external attack from the outside world to the user network. Typical attacks work in a way that external devices challenge the user network by "testing" open ports to find a way to intrude the user network. The firewall can be configured in a way that it does not allow incoming/outgoing packets that do not comply with defined rules, for example defined in terms of ports and source IP-addresses. Although most users do have firewalls on their devices (for example their notebooks), it is becoming common for access routers to also have firewall functionality. Having only a single instance of a firewall in the network has the advantage that it needs to be configured only once per network and not once per device.

Since the user network 102 is Ethernet based, it can be scaled-up considerably. LAN switches—connected to the access router 108 via Ethernet—can help to extend the user network by reach and by connectivity. Each LAN switch typically adds another four to eight ports to the network and LAN switches may be cascaded. This way, as new devices are added, the user network grows, typically using LAN switches. Another common way to extend the reach of a user network is to use wireless repeaters, or WLAN repeaters.

In typical home environments, LAN cabling tends not to be present in all rooms so if, for example, a new device such as a printer is added, and there is no LAN cable available, WLAN switches are often used instead. WLAN access points are available in nearly every user network, and wireless WLAN technology is often employed to extend the reach of a user network.

In addition to WLAN access points, other access points are being proposed, for example cellular Femto access points. These are referred to in the following Femto access points (or FAPs). A Femto access point may also be known as an H(e)NB (home (enhanced) node B), for example in a 3GPP context. Femto access points are low-power wireless access points that have a cellular wireless network air interface to connect to compatible cellular mobile terminals, and are also connected to a mobile network of a mobile network operator (MNO) using any suitable broadband connection, for example residential DSL or cable broadband connections. Femto access points are essentially scaled-down versions of macro cell base stations (that is conventional cells having a relatively large area which might be kilometers or tens of kilometers across). In general, Femto access points are about the size of a WLAN access point, and provide enhanced cellular coverage to an area of about several hundred square meters. This is more than enough for small offices or homes.

Femto access points are generally intended to be stand-alone device attached as an Ethernet device to the user network 102 rather than being integrated directly into the access router 108. Since the location of the access router 108 is normally close to the DSL access (which may be down in a cellar, or in a remote area), connecting a Femto access point via Ethernet can allow a placement in a home or office location wherever radio conditions are best.

As a result of employing Femto access points, a user is provided with localised cellular access in a home or an office environment and so can use already possessed mobile wireless terminals, such as mobile telephones, to make calls using the same radio access types. However, in the case of Femto access points, traffic is transferred to a public land mobile network (PLMN) (or off-loaded directly to the Internet) using the user's broadband connectivity.

It is anticipated that for user networks employing Femto connectivity, there will be one Femto access point per access router. If Femto connectivity becomes widely used, this will result in the use of a large number of Femto access points.

When networks of different network operators are linked together to allow the passage of data, it is often the case that end-to-end functionality is adversely affected. One particular example of this is the introduction of more delay. Furthermore, in the IP-based service world, there will be more and more cases where there is simply no one network operator or individual having end-to-end control over a communication system, even in terms of being able to measure different parts of it. This will be discussed further in the following.

Figure 2:
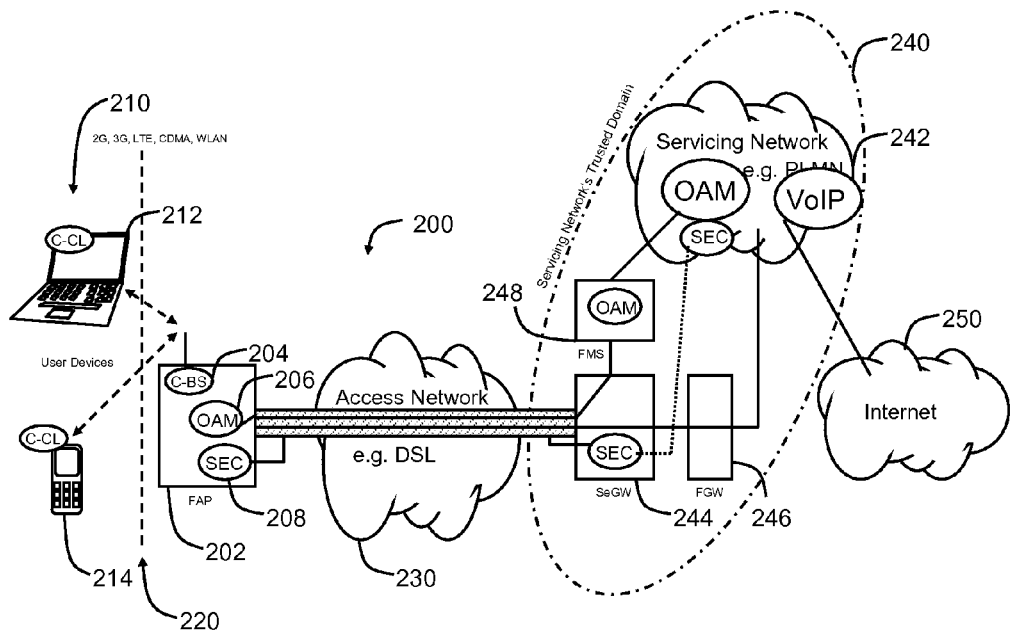

FIG. 2 shows a communication system 200 having a Femto access point 202, terminal devices 210 with which the Femto access point 202 communicates with over a cellular air interface 220, an access network 230 via which the Femto access point can communicate with a network domain 240, in this case comprising a PLMN 242, a security gateway 244 controlling access to the PLMN, and a Femto gateway 246 controlling traffic. The network domain 240 may also comprise suitable Operations, Administration, and Maintenance (OAM) functionality to enable it to control Femto access points. The communication system 200 also includes the Internet 250 which is connected to the network domain 240.

It should be noted that the term "domain" is being used to indicate areas which are under the control of a network operator. Therefore, in the present case, the network domain 240 includes the Femto access point 202. However, from a physical topology perspective, it can be said that the Femto access point is present in a user network (which in the case of FIG. 2 is not shown although details of this kind of network can be seen in others of the Figures) rather than in a mobile network because there is another network, the access network, physically intervening between the mobile network and the user network.

There are a number of different networks present in the system. There is the user network which is controlled by the user, acting as a network operator. There is the access network 230 controlled by a broadband provider network operator. There is the mobile network controlled by the MNO.

Cellular clients 210, for example in the form of cellular-enabled user devices such as laptops 212 or mobile telephones 214 can attach to the Femto access point 202. This contains cellular radio interface functionality (C-BS) 204 which handles the lower layers of the cellular air interface 220, OAM functionality 206 which allows remote configuration and alarm handling, and security functionality (SEC) 208 which allows the Femto access point 202 to establish secure transport tunnels through an insecure network. In the embodiment shown the insecure network is a DSL network.

As mentioned in the foregoing, the network domain 240 has a security gateway, in this embodiment in the form of a security gateway (SecGW) 244. This handles secure tunnelling and acts as counterpart functionality to the SEC 208 of the Femto access point 202. It is capable of terminating secure tunnels between Femto access points 202 in the user network and the security gateway 244. Inter working functions are assigned to a Femto gateway (FGW) 246. In addition, configuration and alarm handling is carried out by a Femto management system (FMS) 248. This carries out OAM-related functions related to the Femto access point 202.

The FMS 248 closely interworks with a network management system (NMS) of a mobile network. According to current proposals, it is assumed that in the system of FIG. 2, either service level agreements are in place between the network operators of the access network 230 and the mobile network 240 or a single network operator would be in charge of both networks. However, in real implementations, this might not be the case. One potential problem which could then arise is the issue of visibility of what happens in the user network and the access network from the perspective of the MNO.

Figure 3:
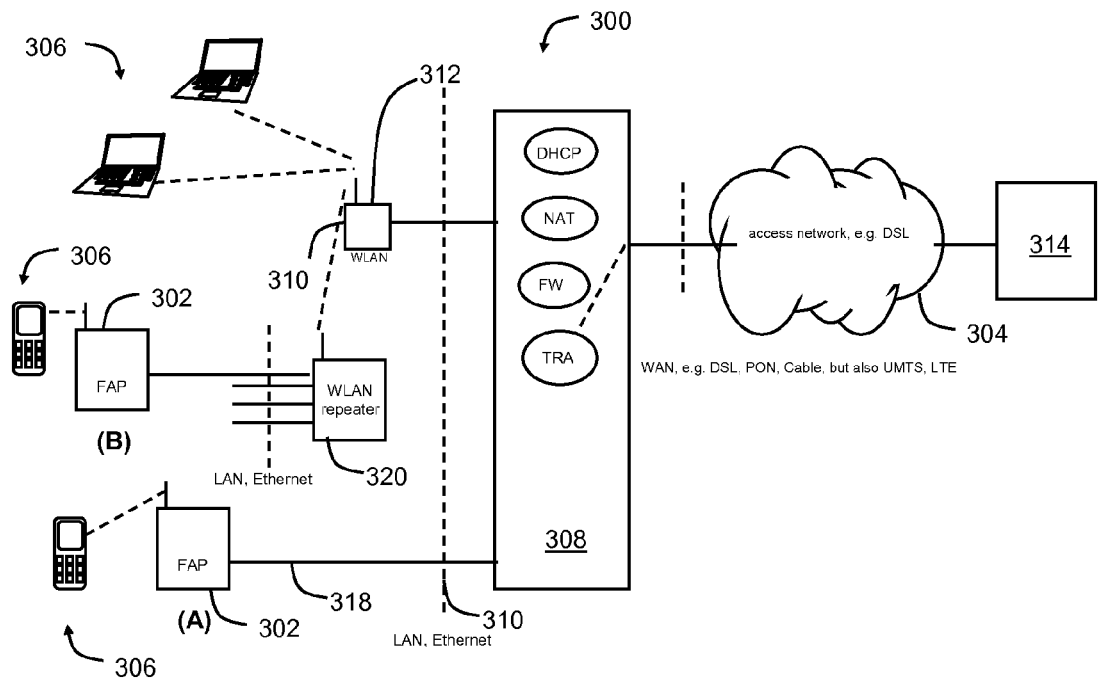

FIG. 3 shows a heterogeneous network environment 300. This is similar to that of FIG. 1, and so corresponding reference numerals have been applied to corresponding parts, although there are a number of differences, the most notable of which is that the environment 300 has a number of Femto access points 302. Since the access network 304 constitutes a domain which connects the Femto access points 316 and a corresponding PLMN, it can be seen that in the network environment 300 according to FIG. 3, network functionality represented by the Femto access points 316 and their PLMN in a logical sense are topologically separated by the access network 304.

When a user is provided with a Femto access point (typically provided as a package from their network operator), they are intended to locate it at the most suitable place in their home or office, that is where the radio coverage is best. This place is often located some distance from an access router 308. Therefore, the user may decided to plug the Femto access point into an available LAN port which is typically provided by a LAN switch which may be wire-line connected 318 to the home network or connected via a WLAN repeater 320. From the user's perspective, this makes no difference: bandwidth and physical connectivity are equivalent regardless of whether pure wire-line or partly wireless connections are employed. Moreover, if the home or office is in a rented building, the user may not even know what sort of connectivity has been provided. The user may just see the LAN port and put it into use.

Using wireless repeaters is becoming more and more popular for a number of reasons:
  prices are low, and are similar to those of wire-line LAN switches;
  wireless connectivity obviates the need to install cables;
  WLAN-based access often provides a higher throughput than wire-line Ethernet; and WLAN repeaters in themselves are sometimes desired because they may be bundled with supplementary services such as music/video streaming and other features.

One problem with using wireless repeaters together with Femto access points is that both devices add a significant delay to the overall end-to-end delay budget. WLAN repeaters may add a round trip delay of typically 100 to 500 ms (depending on the radio technology involved). This may have a negative impact on some services, for example telephony or gaming.

Figure 4:
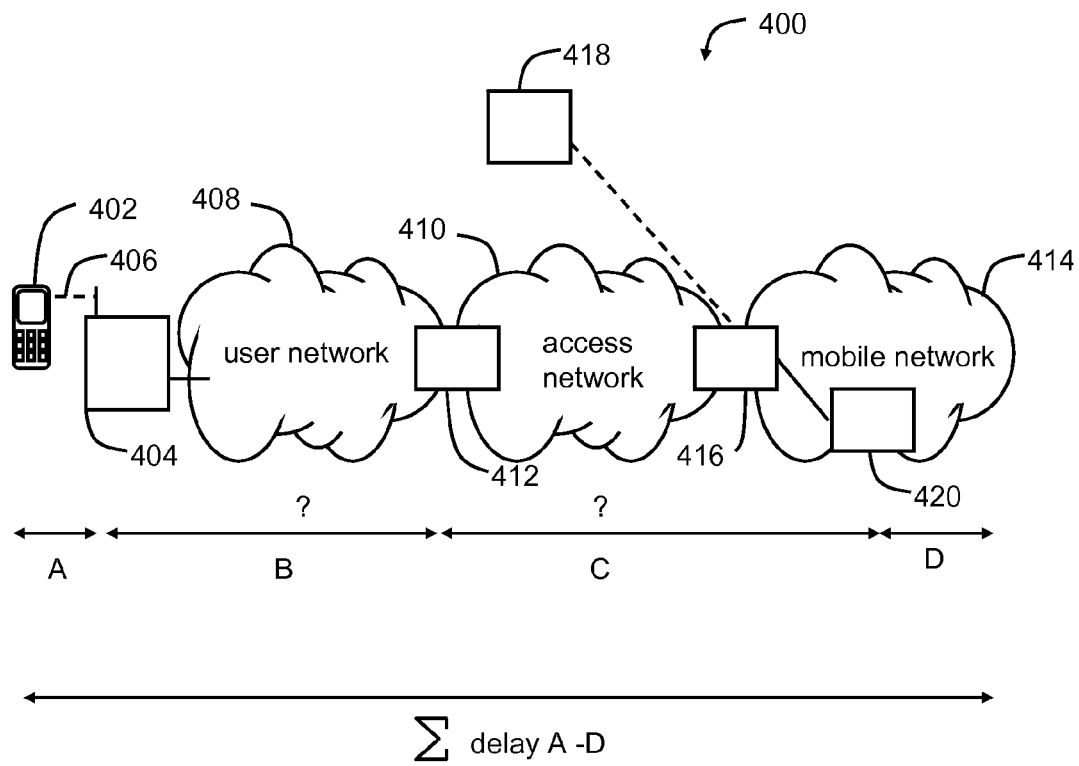

FIG. 4 shows an end-to-end arrangement 400 of a network environment from the perspective of an MNO. In this arrangement 400, a terminal device 402 is able to communicate with a Femto access point 404 over an air interface 406. The Femto access point 404 is connected to a user network 408 which is in turn connected to an access network 410 via an access router 412. The user network 408 is connected to a mobile network 414 via the access network 410 by using a secure tunnel which terminates at a Femto access point 404 and a security gateway 416. The mobile network 414 is under the control of the MNO.

Data which is transmitted from a terminal device via the Femto access point 404 terminates at a Femto gateway 420 of the MNO's network. In travelling between these endpoints, the data traverses a path through a number of different path segments. Some of these path segments are under the control of the MNO, and some are not, especially with respect to the estimation and/or determination of delay. Going now along the path from the terminal device 402, the first path segment is the air interface 406 (A). This adds delay to the system due to propagation (negligible), coding, and handling by the relevant cellular network protocol. This value is either known or can readily be determined by measurement. The second path segment is the user network 408 (B). The MNO does not have access to network elements in this part other than being able to access the Femto access point 404 located in the other side of the user's access router 412 (from the perspective of the MNO). The delay due to this path segment cannot be determined by the MNO. The third path segment is the access network 410. The MNO does not have access to entities outside its domain and the access network is naturally outside of its domain. Therefore, network elements in the access network may not be visible to or addressable by entities which are external to the access network 410. The fourth path segment is transport in the mobile network (D). Since this is under the control of the MNO, the delay contribution of this path segment can readily be determined.

The total end-to-end delay can be measured by sending a message, for example an OAM message, and waiting for a response. The Femto access point 404 is instructed to respond immediately (or at least in a time frame very much shorter than typical access network jitter and delay).

Delays present in various path segments can have adverse consequences for quality of service (QoS) and service delivery. For example, typical delays for voice over IP (VoIP) calls should not exceed 100 ms, and delays for cellular calls should not exceed 150 ms. If a user uses a cellular terminal device to make a telephone call via a Femto access point that is itself connected via a high delay link (such as a WLAN repeater) to a user network, the possible impact on call quality caused by delay will depend on the configurations present in the networks between one party and the mobile network and another party and the mobile network. If the delays are generally small, then the introduction of a larger delay may not have a large impact on quality of service. However, an accumulation of delays, whether a couple of large delays or a greater number of smaller delays, could lead to the voice quality of a call being unacceptable if the cumulative delay is sufficiently large. For example, if the combined delay caused by a Femto access point and the configuration of a user network is 200 ms, this, in itself, might be acceptable because a call to a party in a public switched telephone network (PSTN) could have associated with it an overall delay of 200 ms+10 ms=210 ms (assuming that the delay introduced by the PSTN is 10 ms). However, a call to a party having a Femto access point and non-optimally configured user network could have an overall delay of 200 ms+200 ms=400 ms. This would be unacceptable. A user's experience of such variability may lead to the conclusions that: "sometimes it works, sometimes not—although I did not change anything".

In a worst case, a WLAN repeater will add 500 ms delay. In many cases, this will lead to an unacceptable level of call quality.

As a consequence, the user experience may be that voice calls sometimes work, sometimes the quality is poor, and sometimes it is impossible to make a telephone call at all, even though the call is made in exactly the same manner though the same equipment/configuration (at least on the part of the user). It may be the case that the user will assume that the quality problems are the fault of the MNO.

Naturally, MNOs are concerned that these problems will lead to complaints or their subscribers choosing to end their service arrangements. This may also lead to adverse publicity. Although an MNO would be able to determine that the problem is caused by end-to-end delay, it is not possible to determine exactly where the problem of excess delay arises. For example, does the problem arise as a result of delays introduced in the user network or in the access network?

If an MNO offers an access service based on Femto connectivity to end users over a communication path that may run over several heterogeneous networks (user, DSL, cellular), with each of the path segments contributing a specific delay to the overall end-to-end (cellular service network to end user) delay, in managing this service, although the MNO can measure the end-to-end delay and delay contributions that are caused by path segments which consist of components or elements accessible to the MNO in terms of the MNO being able to carry out measurements, the MNO is not able to determine delay contributions derived from network paths that are, for its perspective, inaccessible or hidden.

According to a first aspect of the invention there is provided a method of determining system performance parameters of a network, the network being one of a plurality of heterogeneous networks in a communication system, a first network operator controlling a first network and controlling a first node, a second network operator controlling a second network, and the first node being located in the second network, the method comprising the steps of:
the first node communicating with at least one other node;
the first node obtaining system-related information as a result of this communication;
the system-related information being used to derive the system performance parameters of the second network.

Preferably, ones of the networks are controlled by respective network operators.

Preferably, the first network is a mobile network. The first network operator may be a mobile network operator.

Preferably, the first node is Femto access point. Preferably, it is inaccessible to the first network operator and is located at the edge of an inaccessible network. The first node may be instructed by the first network operator to measure a delay along a path and report back a measured result. This may be a path to a nearby node, or even the nearest nearby node. It may be a path extending as far as possible away from the first node.

Preferably, a management system in the first network instructs the first node to contact the at least one other node. Preferably, the management system controls operations, administration, and maintenance functions.

Preferably the management system arranges for the sending of commands to the first node to measure various delays. The first node may report the result of its determinations to the management system.

The management system may arrange for the first node to send a command to the first node to measure at least one of a delay caused by the second network and the delay caused by the second network and a third network in combination.

Preferably, the second network is a user network. This may be a network located in a home and controlled by a domestic user of telecommunication services. It may be a network located in a business environment and controlled by a business user of telecommunication services.

Preferably, the second network is not under the control of the first network.

Preferably, the at least one other node is under the control of a network operator other than the first network operator. It may be a network element in the second network. It may be a network element in the first network. It may be a network element in one of the networks of the heterogeneous network environment which is not in the first network or the second network. It may be a gateway, a router, or another type of network element.

There may be a third network in addition to the first and second network. This may be an access network. The access network may be a DSL or cable network.

Preferably, the system-related information is delay information. It may relate to the time taken for a unit of data to cross a network. It may be in respect of one or more of the networks of the heterogeneous network environment. In another embodiments of the invention, other system-related information is determined, for example determining how many nodes there are, what types of nodes there, the addressing schemes applied to the nodes in terms of IP addresses, network topology, for example which node is connected to which other node, or information about traffic flows and/or traffic volumes. This may be determined in respect of a user network. It may be determined in respect of other types of network, for example an access network. It will be appreciated that in such embodiments of the invention, system performance parameters as such are not being generated but instead system characteristics or other system-related information.

The system-related information may be ping-derived information created as a result of the at least one other node being pinged. The ping-derived information may be processed to derive at least one system performance parameter. Of course, pings do not necessarily have to be used. Instead, any can of receive message/respond to message with fast turn around may be used.

The system-related information may be used to diagnose problems within the second network. It may be used to diagnose problems caused as a result of the incorporation of wireless links into the second network.

Preferably, the communication system is one for providing wireless connectivity for a mobile terminal for it to connect to other mobile terminals, non-mobile terminals, databases, servers, and other data sources.

Preferably, the communications system comprises a number of path segments between a terminal device and the first network. It may comprise at least one of the following path segments: an air interface, a user network, an access network, and a mobile network. The first operator may carry out a measurement of the total end-to-end delay of the communications system. However, this might not be user terminal-to-user terminal but may instead be user terminal-to-defined network element.

Preferably, the first network operator is able to determine delay contributions derived from network paths that are, from its perspective, inaccessible or hidden.

In one embodiment of the invention, the second network contains a node or network element which is under the control of the first network operator. It may be directly accessible by the first network operator.

Preferably, the first node is an Ethernet device of the second network.

Preferably, the first node is able to communicate with the at least one other node because it was provided with address information in respect of the at least one other node when the address information was assigned to the at least one other node. This information may have been provided automatically to the first node during an address assignment operation for the at least one other node.

Preferably the first node communicates with the at least one other node by pinging it. The first node may determine a round-trip-time. The first node may report this round-trip-time, for example to the first network operator or may use it itself to determine a delay associated with the second network.

The first network operator may check the delay associated with the second network and determine if the delay is excessive delay. If the determination is that the delay is excessive, the first network operator may arrange for this problem to be resolved.

According to a second aspect of the invention there is provided a communication system comprising:
a plurality of heterogeneous networks;
a first network under the control of a first network operator;
a second network under the control of a second network operator;
a first node capable of obtaining system-related information as a result of communicating with at least one other node, the first node being located in the second network and being under the control of the first network operator;
the first network operator being provided with system performance parameters of the second network based on the system-related information.

According to a third aspect of the invention there is provided a node capable of communicating with at least one other node and being capable of obtaining system-related information as a result of this communication in respect of a network, the network being one of a plurality of heterogeneous networks in a communication system, the node being under the control of a first network operator and being located in a second network, the first network operator also controlling a first network, a second network operator controlling a second network, and the system-related information being used to derive the system performance parameters of the second network.

According to a fourth aspect of the invention there is provided a computer program product comprising software code that when executed on a computing system performs a method of determining system performance parameters of a network, the network being one of a plurality of heterogeneous networks in a communication system, a first network operator controlling a first network and controlling a first node, a second network operator controlling a second network, and the first node being located in the second network, the method comprising the steps of:

the first node communicating with at least one other node;
the first node obtaining system-related information as a result of this communication;
the system-related information being used to derive the system performance parameters of the second network.

Preferably, the computer program product has executable code portions which are capable of carrying out the steps of the method.

Preferably, the computer program product is stored on a computer-readable medium.

A number of advantages are provided by the invention. For example, the first network operator may be able to get a clearer picture of where delay critical areas are present in a communications system. In addition, the first network operator may be able to act prior to problems occurring. One way of doing this may be for the first network operator to arrange for delay measurements to be regularly taken by the node and provided to it so that it can foresee where problems might occur and act before customers complain. The first operator may be able to distinguish which network(s) is (are) the cause of a problem.

The first network operator may be able to limit the administrative actions it needs to carry out. Instead of taking action in respect of all subscribers, it can now identify the few percent of them for whom remedial action may be required.

The invention may provide the first network operator with the opportunity to take, depending on its findings, actions which are more appropriate:

in case the access provider "plays unfair", it can now provide evidence and request compliance with service level agreements;
if user caused delay is critical, it can individually advise the user; and/or
if radio resource management is critical, it can apply technologies, for example timing advance Furthermore, the first network operator may be able to reduce customer complaints and raise its reputation by providing a consistently good quality of service.

Figure 5:
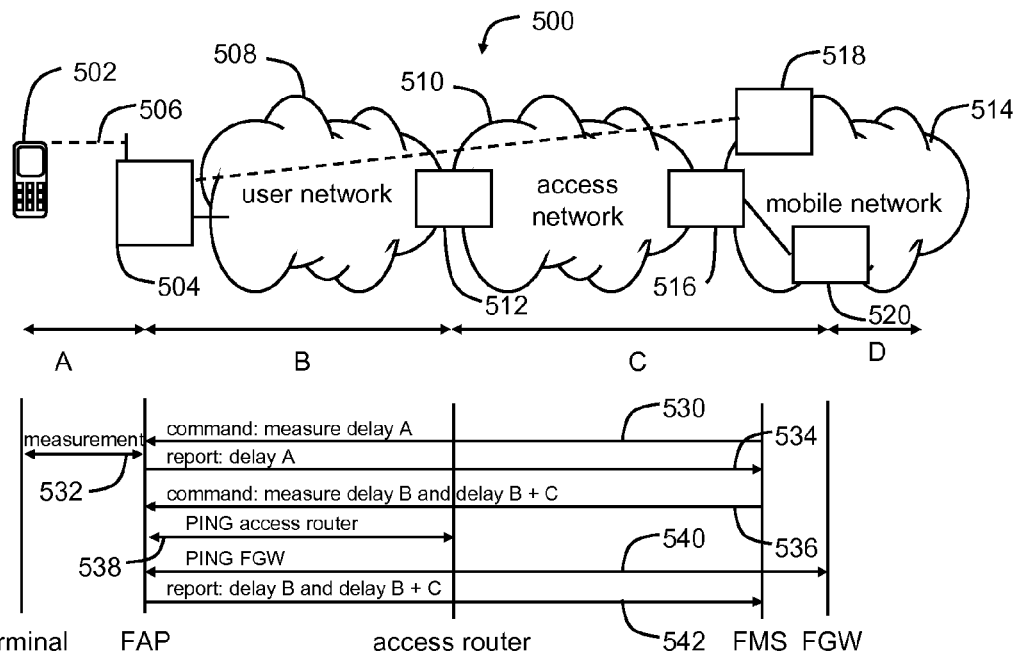
Figure 6:
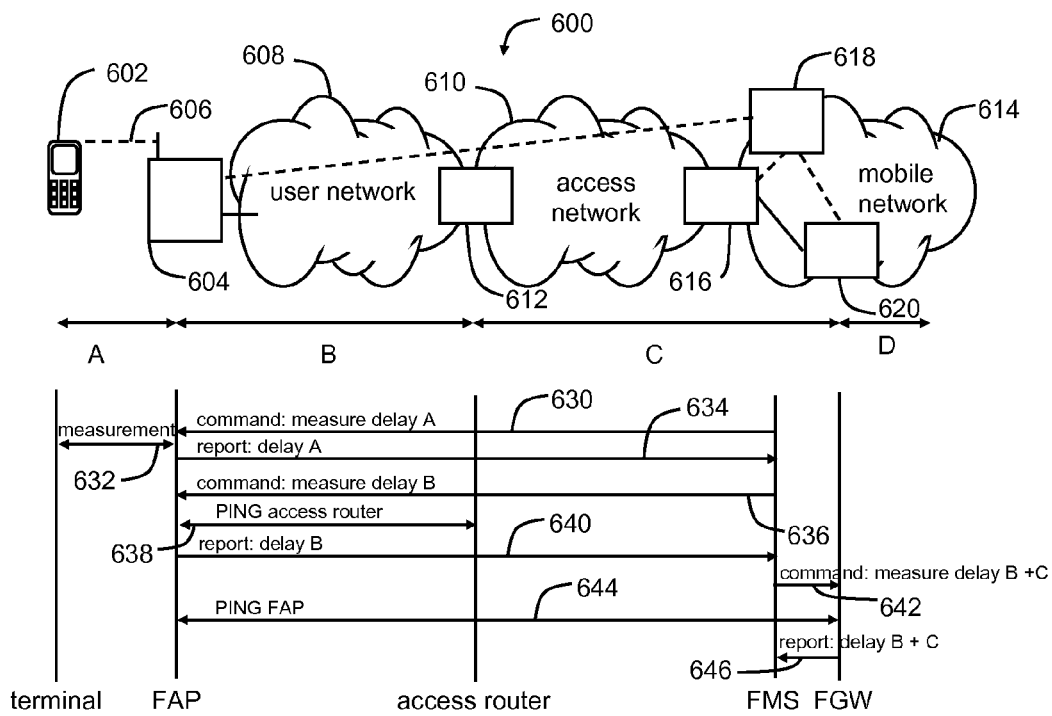
Figure 7:
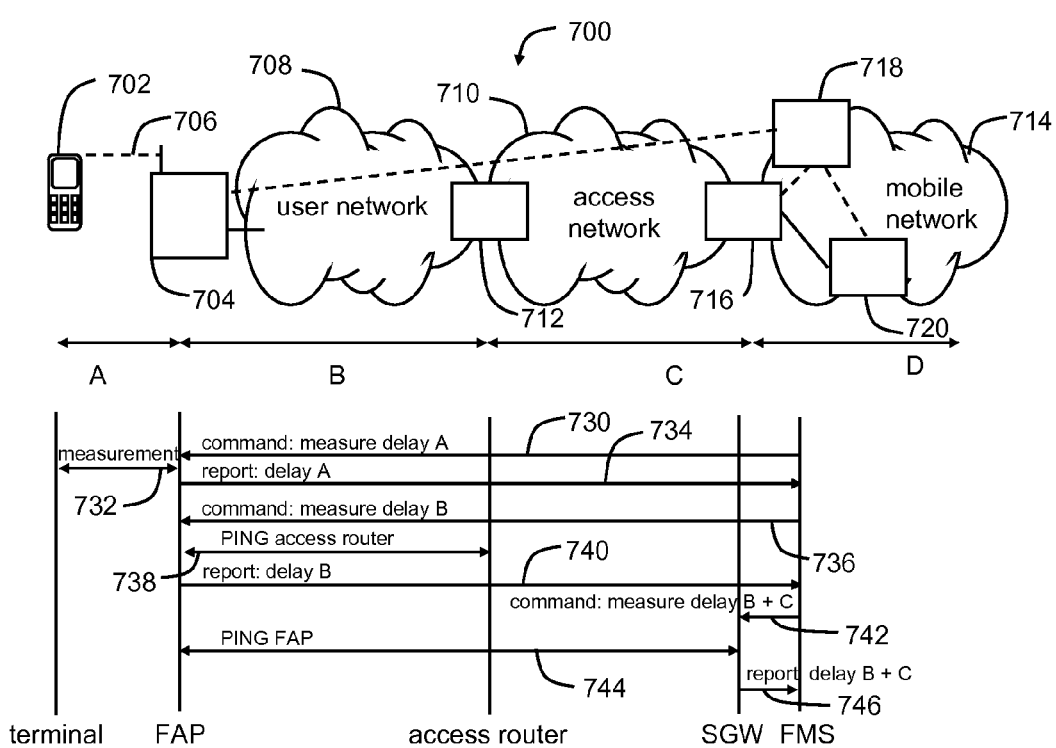

An embodiment of the invention will now be described, by way of example only, with reference to the accompanying drawings in which:

FIG. 1 shows a heterogeneous network environment;
FIG. 2 shows a communication system having a Femto access point;
FIG. 3 shows another heterogeneous network environment;
FIG. 4 shows the end-to-end arrangement of a network environment from the perspective of a network operator; and
FIG. 5 shows the end-to-end arrangement of a network environment from the perspective of a network operator according to the invention;
FIG. 6 shows the end-to-end arrangement of another network environment from the perspective of a network operator according to the invention; and
FIG. 7 shows the end-to-end arrangement of yet another network environment from the perspective of a network operator according to the invention.

FIG. 5 shows the end-to-end arrangement 500 of a network environment from the perspective of an MNO according to the invention. This shows the arrangement of FIG. 4 and additionally includes signalling by which the invention is performed. In common with FIG. 4, FIG. 5 shows the end-to-end arrangement 500 comprising a terminal device 502, a Femto access point 504, an air interface 506, a user network 508, an access network 510, an access router 512, a mobile network 514, a security gateway 516, a Femto management system 518, and a Femto gateway 520. FIG. 5: As is explained in the foregoing, the Femto access point can be located in a home or in an office location. There are a number of network operators involved: a user control the user network 508, a broadband provider controls the access network 510, and an MNO controls the mobile network 514 (the MNO is actually controlling its PLMN).

As explained in the foregoing, the MNO is able to determine the overall end-to-end delay. It can also check to see whether there are unexpected levels of delay by measuring the delay between the terminal device 502 and the Femto access point 504 (delay A) and the delay within the mobile network of the MNO (delay D). The delay A can be measured by the Femto management system 518 instructing the Femto access point 504 to measure the delay on the air interface 506. The delay D can be derived indirectly from an end-to-end measurement or by direct measurements which can readily be done since the MNO controls its own network.

However, the user network 508 and the access network 510 are inaccessible to the MNO in terms of it being able to directly interrogate network elements under the control of these networks. Hitherto, the MNO has been unable to determine which the part of the overall delay is caused by the user network 508 and which by the access network 510. For example, the access router 512 is inaccessible from outside the access network 510 in terms of being interrogated to determine delay measurements.

According the invention, it is recognised that although the user network 508 is not under the control of the MNO, firstly this network contains a network element which is under the control of the MNO and directly accessible by it, in this case the Femto access point 504, and secondly that since this network element is a device of the user network 508 having corresponding standardised interfaces and configuration (in this embodiment those of Ethernet networks), it is provided with relevant IP address information of particular devices present in the user network 508. For example, in the present embodiment of the invention, when the access router 512, as a gateway device, has its IP address assigned via DHCP, the Femto access point receives this information automatically. As a consequence, the access router 512 will reply to Ping requests coming from inside the network. In addition, the Femto access point is also able to ping the Femto gateway (which is outside the user network) which it does by sending a message along the IPsec connection between the Femto access point and the SecGW and then getting a response.

Accordingly, it is possible for OAM functionality within the mobile network 514, in this case the FMS 518, to instruct the Femto access point 504 to "ping" the access router 512 and the FGW 520 and report back the measured delays, respectively delay B and delay B+C. The information obtained from the pinging operations represents round trip time (RTT) which can readily be converted into a delay value, for example the Femto access point 504 or the FMS 518 can determine the relevant delay as RTT/2. As an example, in the case of a Femto access point physically connected to the access router 512 by cable, the delay B will typically be 1 to 2 ms and in the case of a wireless connection between these elements, a delay of 100 ms or more is typical.

This message exchange is shown in FIG. 5. The lower part of this Figure shows the messages exchanged according to one embodiment of the invention. This is a diagnostic procedure and so falls under the control of the OAM part of the network, in particular the FMS 518. Therefore the OAM part sends a first command 530 to the Femto access point 504 to measure the delay A caused by the air interface which then does so 532. The Femto access point 504 reports the result of its determination, the delay A, to the FMS 518 in a report message 534. The OAM part sends a second command 536 to the Femto access point 504 to measure the delay B caused by the user network 508 and the delay B+C caused by the user network 508 and the access network 510 in combination.

The Femto access point 504 pings 538 the access router 512 and measures a first RTT. The Femto access point 504 then determines the delay B from the RTT. After this, the Femto access point 504 pings 540 the FGW 520 and measures a second RTT. The Femto access point 504 then determines the delay B+C from the RTT. Once the Femto access point 504 has determined the delay B and the delay B+C, it reports the result of its determination, the delay B and also the delay B+C, to the FMS 518 in a report message 542.

It should be noted that the delay C is not purely the delay caused by the access network 510 but is this delay and also an additional delay caused by traffic travelling between the security gateway 516 and the FGW 520. However, since this additional delay is small and in any case is under the control of the MNO which can take remedial action if it is too high, it is not of major concern.

If the focus of the investigation being carried out by the MNO is sub-optimal (for example delay-causing) implementations within the user network 508, it is sufficient for the delay B to be measured and reported. However, since the Femto access point 504-FGW 520 link is a tunnelled connection which can readily be measured, this measurement is performed. Accordingly, the Femto access point 504 measures RTTs to provide the delays B and B+C which are then sent to the MNO. It will be recognised that any suitable and measurable combination of delays can be provided to the MNO. In this way, the MNO is able to get a good level of detail of delay contributors in the network environment.

Although a particular sequence of messages and/or measurements is described with reference to FIG. 5, this sequence does not have to be applied in implementing the invention because the results of one measurement are not needed for another measurement to be made and the results of one command are not needed for another command to be executed. The commands shown may be combined into a single command. The reports may be combined into a single report.

FIG. 5 shows the commands originating from, and the report being received by, the FMS 518. However, various possibilities are possible within the scope of the invention. The FMS 518 may simply pass on commands and reports which come from, and are meant to go to, other network elements. Commands and reports may be handled by the FMS 518 or may in fact by handled by more general OAM functionality within the mobile network. Although in the foregoing, there is shown the FMS 518 having OAM capability dedicated to managing Femto access points and a separate OAM functionality for more general purposes in the mobile network, this does not have to be the case. If the use of Femto access points becomes wide-spread, it may be the case the FMS 518, or at least its OAM capability, may be incorporated into the mobile network OAM functionality.

Examples of variations will be described with reference to FIGS. 6 and 7.

FIG. 6 shows the end-to-end arrangement of another network environment from the perspective of a network operator according to the invention together with a related message exchange. This is similar to that of FIG. 5, and so corresponding reference numerals have been applied to corresponding parts, although there are a number of differences, the most notable of which are in the message exchange. The command 630, measurement 632, and report 634 in respect of the delay A correspond to equivalent operations in FIG. 5. However, the FMS 618 commands 636 the Femto access point 604 to ping 638 the access router 612 and then report 640 the delay B. Following this, the FMS 618 commands 642 the FGW 620 to ping 644 the Femto access point and then report 646 the delay B+C.

FIG. 7 shows the end-to-end arrangement of yet another network environment from the perspective of a network operator according to the invention together with a related message exchange. This is similar to that of FIGS. 5 and 6, and so corresponding reference numerals have been applied to corresponding parts, although there are a number of differences, the most notable of which are in the message exchange. The command 730, measurement 732, and report 734 in respect of the delay A correspond to equivalent operations in FIGS. 5 and 6. However, the FMS 718 commands 736 the Femto access point 704 to ping 738 the access router 712 and then report 740 the delay B. Following this, the FMS 718 commands 742 the SGW 716 to ping 744 the Femto access point and then report 746 the delay B+C.

Once the OAM part of the network has received the delay B and delay B+C information, it can use them to determine the delay C.

Although it may be assumed that the results obtained by:
(i) the Femto access point 504 pinging (538 and 540) both the access router 512 and the FGW 520;
(ii) the Femto access point 604 pinging 638 the access router 612 and the FGW 620 pinging 644 the Femto access point 604;
(iii) the Femto access point 704 pinging 738 the access router 712 and the SGW 716 pinging 744 the Femto access point 704,
can be used to derive delays B and C, it is still useful for the MNO to know the overall end-to-end delay and the contributions to this from the delays A, B, C, and D in order to check whether end-to-end quality of service might be compromised and what possible actions might be possible to help the situation. Therefore, although in some embodiments of the invention it might not be strictly necessary, the MNO determines delays A and D in addition to delays B and C. To give an example of how all of the delays can be used to assess potential problems, the MNO itself might add a significant delay, that is delay D, for example by using fractional ATM, TDMA based relay paths etc. and, looking at all of the delays, it might become apparent that action on its part might mean that the end-to-end delay can be taken from a level which is unacceptable/undesirable to one which is acceptable. For example, if the end-to-end delay is just on (or just over) the verge of adversely affecting quality of service, a modification to how the mobile network 514 or constituent network equipment is arranged, might be able to reduce the delay to an acceptable level. Although a determination of delays B and C might have revealed that they are excessive, it might be easier for the MNO to remedy an unacceptably large delay caused by something under its control rather than trying to persuade another network operator to take remedial action. Equally, the MNO can determine the delays caused by as many of the network elements and networks as possible and seek remedies both in respect of those under its control and those under the control of other network operators.

An example will now be provided of how the MNO, having determined the delay information may choose to act. If the MNO detects that there is an excessive delay B in the user network, a customer care department of the MNO can inform the user (by e-mail or by telephone) or a customer care installation representative of the MNO can visit the user's premise and resolve the problem. For example, in order to test whether there is a problem in the WLAN part of the user network, the MNO representative can unplug the Femto access point 504 from a WLAN repeater and plug it to a wire-line LAN switch or test the operation of the user network 508 when it uses a low-delay repeater.

Generally, such visits are undesirable from the perspective of the MNO. However, if the MNO is able to use measurement of the delay B to identify those cases where there does, in fact, seem to be a problem in the user network, arranging such visits is a more practical proposition since the likelihood of resolving problems will be greater.

If the MNO detects that the delay C is excessive, it can collect statistics to determine the extent of the problem, for example whether all, or a large number of, users connected via one access provider have a similar problem. In this case appropriate remedial action may be to inform the access network operator that the problem is in its network and to encourage it to resolve the problem. If it is determined that only one or several users is/are affected, it is likely there is a mis-configuration, for example a wrong DSLAM port; and the appropriate remedial action may be to provide the access network operator with the information which user(s) is(are) affected which enables it to identify and fix the problem. This might involve the access network operator re-configuring a mis-configured network element. Naturally, since there could be several problems adversely affecting various users originating in both networks, both actions could take place.

The invention takes advantage of the fact that although a Femto access point is in a network that is controlled by another operator, it is controlled by the MNO. In this particular case, the Femto access point may or may not even be in the same network as the network element(s) it pings, because in one case it pings an access router which can be said to be in a user network or in a access network depending on the specific implementation and in another case it pings a FGW in a mobile network. Therefore, in this latter case, there is the unusual situation that a network operator uses a network element in a network it does not control to ping a network element in a network it does control. It will be appreciated, that the benefit provided by the invention is that the pinging traverses at least one network which is not under the control of the network operator.

It is worth noting that in the foregoing the Femto access point is not in an access network, but is actually in another network, a user network, which is one step further away from its mobile network in a topological sense. In addition, the user network is controlled by the user, who is generally unaware of the need to provide optimised network conditions, that is to reduce delay. It could be said that there is a nested network (the user network) in the access network, and this nested network remains hidden to both the MNO and the network operator of the DSL network, in terms of its topology (the number of nodes and how they are connected and interconnected to one another) and in terms of performance parameters.

Furthermore, although the invention has been described in terms of the access router being located in the user network, it does not necessarily have to be the case. In some cases, the access router can more properly be described as being in the access network, or more accurately relevant functionality present within it more properly described as being in the access network, at least in terms of its logical topology as opposed to its physical topology. Therefore, it will be understood, that certain functionalities of the access router are under the control of the user and certain other functionalities are under the control of the access network provider, and also that it could be said to be, at least in some embodiments, partially present in at least both networks.

It should be noted that although the invention has been described in relation to Femto access points, it is not so limited. It can be applied to any network environment comprising a number of different domains, wherein a node controlled by a network operator has been placed in a non-controlled network. As long as the node is permitted to investigate the non-controlled network, or make investigations of the network environment from the non-controlled network, this may enable the network operator to "see" as much of the non-controlled network, and indeed the overall network environment, as typical nodes of the non-controlled network are able to see.

Other embodiments of the invention are possible. The first node could, instead of being a network element, be a device, for example a terminal device such as a laptop. It may be the case that this device is loaded with software provided by the first network operator and this software in-situ carries out the necessary activities related to obtaining system-related information. In one embodiment, the first network operator may offer a service to a user or a subscriber offering a diagnostic software package which, when loaded on a user device, provides a diagnostic functionality which carries out measurements of the user's network to obtain system-related information.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of determining system performance parameters of a network, the network being one of a plurality of heterogeneous networks in a communication system, a first network operator controlling a first network and controlling a first node, a second network operator controlling a second network, and the first node being located in the second network, the method comprising the steps of:
   the first node communicating with at least one other node;
   the first node obtaining system-related information as a result of this communication; and
   the system-related information being used to derive the system performance parameters of the second network,
   wherein the first node comprises an access point.

2. A method according to claim 1 in which ones of the networks are controlled by respective network operators.

3. A method according to claim 1 in which the first network operator is a mobile network operator.

4. A method according to claim 1 in which the first node is Femto access point.

5. A method according to claim 1 in which the first node is instructed by the first network operator to measure a delay along a path and report back a measured result.

6. A method according to claim 1 in which the second network is a user network.

7. A method according to claim 1 in which the second network is not under the control of the first network.

8. A method according to claim 1 in which the at least one other node is under the control of a network operator other than the first network operator.

9. A method according to claim 1 in which there is an access network in addition to the first and second network.

10. A method according to claim 1 in which the system-related information is used to diagnose problems caused as a result of the incorporation of wireless links into the second network.

11. A method according to claim 1 in which first node communicates with the at least one other node by pinging it.

12. A method according to claim 1 in which the first node determines a round-trip-time and report this to the first network operator.

13. A method according to claim 1 in which the first network operator checks the delay associated with the second network and determines if the delay is excessive.

14. A method according to claim 1 in which the first node is able to communicate with the at least one other node because it was provided with address information in respect of the at least one other node when the address information was assigned to the at least one other node.

15. A method according to claim 1 in which the communications system comprises a number of path segments between a terminal device and the first network and measurements are carried in respect of a number of delays present along these paths during operation of the communications system.

16. An apparatus, comprising:
a node configured to communicate with at least one other node and configured to obtain system-related information as a result of this communication in respect of a network,
wherein the network is one of a plurality of heterogeneous networks in a communication system,
wherein the node is under the control of a first network operator and is located in a second network,
wherein the first network operator is also configured to control a first network,
wherein a second network operator is configured to control a second network,
wherein the system-related information is configured to be used to derive the system performance parameters of the second network, and
wherein the node comprises an access point.

17. A communication system comprising:
a plurality of heterogeneous networks;
a first network under the control of a first network operator;
a second network under the control of a second network operator; and
a first node configured to obtain system-related information as a result of communicating with at least one other node, the first node being located in the second network and being under the control of the first network operator,
wherein the first network operator is provided with system performance parameters of the second network based on the system-related information, and
wherein the first node comprises an access point.

18. A non-transitory computer readable medium comprising software code that when executed on a computing system performs a method of determining system performance parameters of a network, the network being one of a plurality of heterogeneous networks in a communication system, a first network operator controlling a first network and controlling a first node, a second network operator controlling a second network, and the first node being located in the second network, the method comprising the steps of:
the first node communicating with at least one other node;
the first node obtaining system-related information as a result of this communication; and
the system-related information being used to derive the system performance parameters of the second network,
wherein the first node comprises an access point.

19. A non-transitory computer readable medium according to claim 18 which has executable code portions which are configured to carry out the steps of the method.

20. A non-transitory computer readable medium according to claim 18, wherein the non-transitory computer readable medium stores a computer program product.

* * * * *